Jan. 23, 1940.   R. H. ZINKIL ET AL   2,188,258
MIXING VALVE
Filed April 21, 1937   3 Sheets-Sheet 1
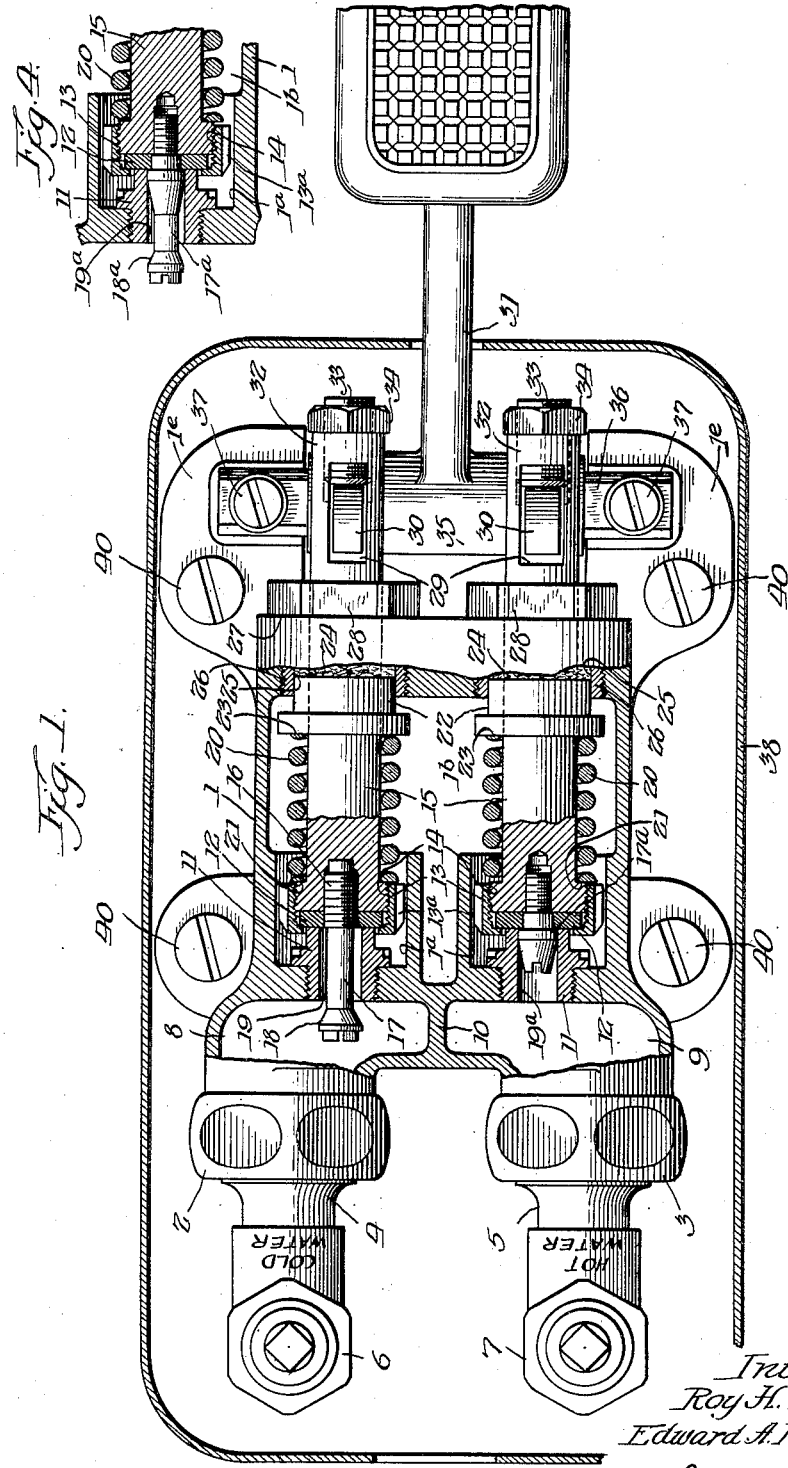
Inventors:
Roy H. Zinkil &
Edward A. Fredrickson.
By Joseph O. Lange
Atty.

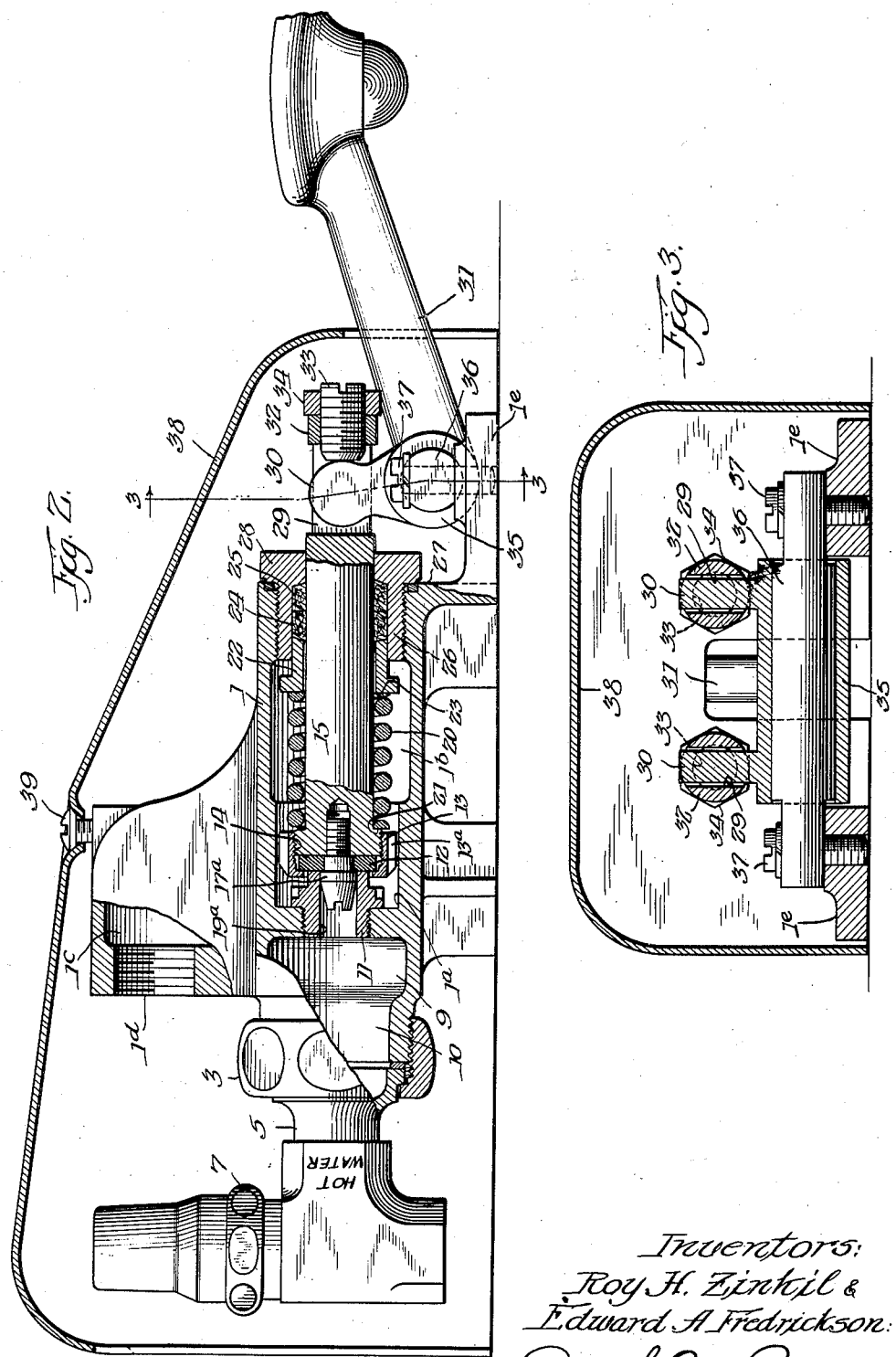

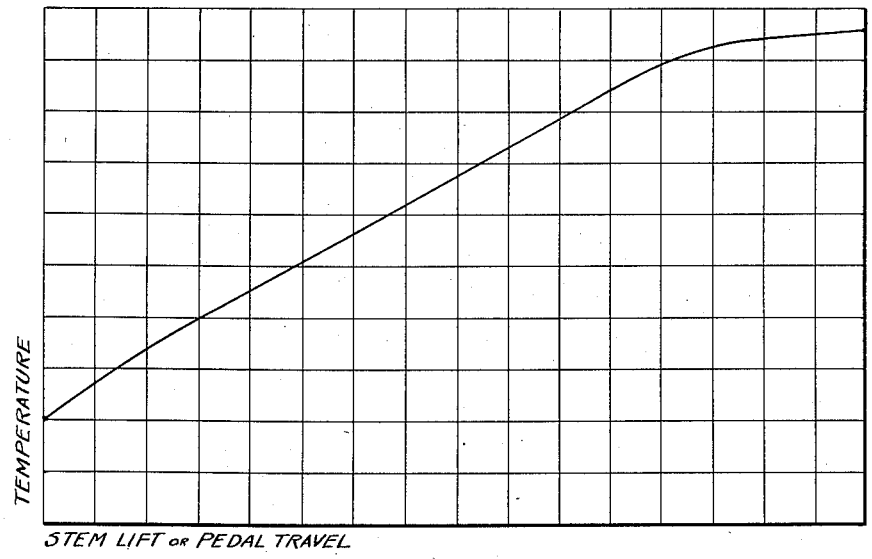
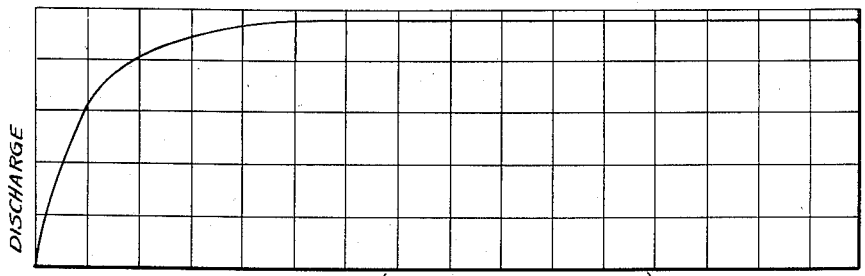
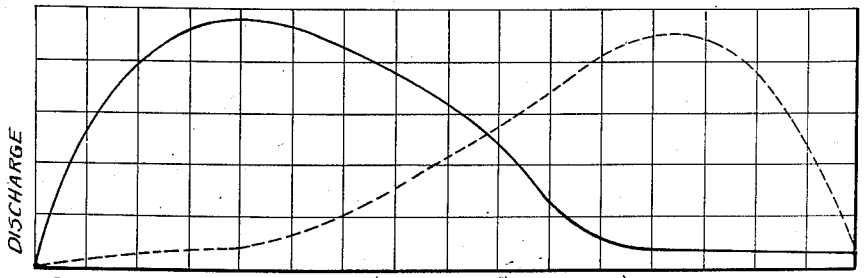

Patented Jan. 23, 1940

2,188,258

UNITED STATES PATENT OFFICE 2,188,258

MIXING VALVE

Roy H. Zinkil, Oak Park, and Edward A. Fredrickson, Chicago, Ill., assignors to Crane Co., Chicago, Ill., a corporation of Illinois Application April 21, 1937, Serial No. 138,120

3 Claims. (Cl. 277—20)

More specifically, our invention relates to a novel type of mixing device comprising a plurality of inlet valves, the latter being actuated substantially simultaneously by a single pedal arrangement and which constitutes a distinct improvement over our prior construction identified by our copending application, Serial No. 110,582, which was filed November 13, 1936, the latter being a division of our application Serial No. 730,004, filed June 11, 1934, now Patent No. 2,094,288, granted September 28, 1937, and supplemental to Patent No. 2,116,806 for a Mixing valve, granted May 10, 1938.

We are aware that previous attempts have been made to obtain mixing valves in which a single pedal arrangement has been used to actuate the respective valves. However, the prior constructions have lacked several desirable and very essential elements in this type of valve in failing to provide for accurate and convenient adjustment of the respective travel of the hot and cold water valves with a minimum of effort or skill on the part of the user. Also the prior constructions used for actuating the valves have lacked satisfactory means for permitting simple and economical installation with reference to repair and replacement when necessary and, in addition, no provision has been made in the prior art for extremely close adjustability, which is so desirable in this class of work, so that at best in the past only the usual supply of tempered water was provided for, without requiring sensitive adjustability for independent flow of each source of supply.

In contradistinction to these prior constructions, one of the more important objects of our invention lies in the provision of a compact mixing valve construction in which relatively prompt and easy adjustability may be made to suit the numerous varieties of installations met with in the field, possessing such a wide range of adjustability, so that if desired, and as hereinafter described, either cold water or hot water, substantially independently of each other, may be obtained in addition to the usual mixed or tempered water. Further, we have provided a construction in which the quantity of the volume delivered of either the hot or cold water may be adjusted to suit the character of the installation. For example, in such case where the hot water is available at relatively high temperatures, the operating mechanism for the hot water valve can be easily adjusted or set accordingly in order to be more economical and, if desired, the cold water valve can be likewise adjusted to produce increased volume therethrough.

Another advantage of our invention resides in the provision of a construction so that in either the hot water or cold water valve, or both, adjustment may be made of each so that the temperature of the mixture may be limited, regardless of the respective temperatures of the hot or cold water supply.

Provision is also made for the application of full pedal load being exerted by the operator's foot, since the latter, due to a suitable design of housing and a low hung valve casing, is provided with generous space, including such positioning of the pedal so as to permit convenient sweeping of the adjacent floor space therebeneath.

Another object of our invention lies in the provision that the casing or valve body may be easily and securely attached with relation to the floor or similar mounting without interfering with its actual operation or with the initial setting at the factory. Likewise, the usual problem of proper roughing in concerning the location of this type of device with relation to the plumbing fixture is easily avoided, due to the convenient floor type of installation used.

Another important object lies in the provision of a construction in which the temperature of the mixed water may be maintained relatively uniformly or constantly in its increase, as explained in more detail hereinafter in describing the accompanying graphs based upon performance tests.

Other objects and advantages of the construction will become more readily apparent in proceeding with the following detailed description in connection with the patent drawings, in which Fig. 1 is a partial sectional assembly view in plan view showing a conventional arrangement of valves with relation to the hot and cold water supply, as respectively designated therein.

Fig. 2 is a fragmentary sectional assembly view taken on the vertical centerline of the hot water side of the valve casing and showing the arrangement thereof with relation to the outlet discharge.

Fig. 3 is a sectional assembly view taken on the line 3—3 of Fig. 2 showing the pedal shaft and the respective levers with relation to the slotted valve stems, and the manner of attaching the pedal shaft to the valve casing.

Fig. 4 is a fragmentary sectional view showing a modified throttling construction for assembly with the hot water valve so as to reduce the flow therefrom upon continued predetermined movement of the operating pedal in the opening direction.

Fig. 5 is a graph showing plotted results of actual tests illustrated by a mixed water temperature curve, illustrating the desirable uniformity of increase in temperature and in which the adjusting screws for the respective valves were set so as to permit the respective hot and cold water valves to open at substantially the same time upon actuation of the pedal.

Fig. 6 is a graph showing the volume of mixed water as discharged, recorded in actual tests, and then plotted, the volume being based upon its relation to the stem lift or pedal travel, and in which the valve construction and throttling arrangement for the cold water valve and hot water valve is similar to that illustrated in Fig. 1.

Fig. 7 is a graph showing the respective volumes of water admitted and discharged through the respective hot water and cold water sides of the casing in relation to the stem and pedal travel, the solid line representing plotted action of the cold water valve, while the dotted lines indicate the movement of the hot water valve, respectively. In this graph, however, the results are based upon a valve construction for the cold water valve similar to Fig. 1, while the hot water valve construction is based upon the modified construction shown in Fig. 4.

Similar reference characters refer to similar parts throughout the various views.

Referring now to Fig. 1 of the patent drawings, the valve casing 1 is of the well known type, having the usual inlet connections to the respective hot and cold water supply lines, the connections in this case comprising the conventional union rings 2 and 3 respectively, connected to said water supply lines 4 and 5 preferably provided with the inlet stop valves 6 and 7, the latter being for the purpose of shutting off the lines for repairs or replacements within the unit or fixture. The valve casing is connected with the inlet chambers 8 and 9, leading respectively from the cold water and hot water supply pipes and having the partition wall 10 therebetween. A renewable valve seat ring 11 is preferably, but not necessarily, provided in each case for the respective water valves. The disc or valve closure member 12 is held in any suitable manner as, for example, by means of a retaining disc holder cap 13 which is threadedly attached, as at 14, to the stem 15 thus clamping the disc 12 therebetween for movement with the stem.

It will be noted that in order to allow for the passage of both hot and cold water past the respective disc holder caps 13, the latter are provided with peripherally spaced ribs 13a suitably movable within the casing bore 1a, thereby serving to guide the stem and disc holder cap during its opening and closing movements, and also enabling the water to flow into the casing chamber 1b, thence into the upper chamber 1c which is in direct communication with the outlet 1d, as more clearly shown in Fig. 2. Such connection from the outlet 1d may vary to suit conditions of installation.

Threadedly mounted within the end of the stem 15 and at the lower portion thereof so as to extend within the seat ring, a disc screw 16 is positioned which functions as a throttling member and is provided with an elongated portion 17. As clearly indicated for the cold water valve, the latter member 17 has a reduced middle and end portion where it approaches its point of attachment 16 to the stem and at its other extremity is provided with an enlarged head or thickened end 18, suitably of such diameter so as to fit snugly within the opening or inlet of the seat 11. The advantage of the latter arrangement lies in the provision that after a predetermined travel of the stem with the cold water disc 12 in the opening direction, the thickened head 18 because of its entry within the seat bore 19 will serve first to restrict and then to virtually cut off the flow of water therethrough upon its further movement into the said seat opening. During the same interval of travel, assuming the position of the valves to be as shown, the hot water disc screw 17a will likewise be moved further from the seat opening 19a, thereby substantially increasing the volume of flow of hot water therethrough, and increasing the effectiveness of such flow, due to the cold water flow being substantially diminished for the reason above mentioned.

In order to maintain the valve disc 12 upon its seat 11, a spiral spring 20 is preferably used, although obviously any resilient means may be used with equally good effect. The spring 20 bears upon the stem, as at the shoulder 21, the other end thereof bearing against the upper surface 23 of the packing gland 22, thereby serving to keep the packing 24 under suitable compression within the stuffing box 25. The latter member is conveniently formed, as more clearly shown in Fig. 2, within the threaded bushing 26 by providing an annular clearance surrounding a portion of the stem 15. The threaded bushing 26 shoulders against the end of the casing as at 27 and is tightened in position by means of rotative effort applied to the polygonally formed head 28.

Continuing with the further description of the construction, each valve stem 15 is journalled for reciprocal or sliding movement within the packing gland 22, the packing 24 and within the polygonal end portion 28 of the threaded bushing 26, as more clearly shown in Fig. 2. Each valve stem 15 is preferably provided with the slotted or bifurcated end portion 29 thereby providing means for engagement with the pedal projecting portion or lever 30 preferably integrally attached to the pedal 31 so that upon depressing the pedal 31 the lever 30 is caused to move arcuately forward, and by such movement drawing the valve stem longitudinally against the action of the spring member 20, thereby lifting or withdrawing the valve disc 12 from its seat 11.

For purpose of convenient adjustability of movement, as hereinafter described in greater detail, each stem 15, that is for both hot and cold water, is provided, as at 32, with an adjusting set screw 33 together with a lock-nut 34, whereby the clearance between the pedal lever 30 and the ends of the bifurcated portions 29 may be separately reduced or increased, as desired, thus definitely establishing accurately the amount of longitudinal movement of each stem 15, as desired, when the pedal 31 is depressed. In further explanation of the advantages gained, this relatively simple adjustability thereby enables the user to easily control the amount of play and therefore the amount of arcuate travel of each vertically extending lever 30 before the latter members contact with the ends of the set screws 33, that is, just when actual longitudinal movement of each stem occurs, and when the valve closure 12 actually commences to leave its seat.

Obviously, this provision permits a simple but very accurate adjustment to be made for each of the hot water and cold water valves independently, thus accomplishing extremely sensitive and accurate control of the flow of water therefrom.

The operating pedal 31 is provided with a preferably centrally positioned hollow hub 35 within which the pedal shaft 36 is rotatably journalled, the latter member being fixedly and nonrotatably positioned upon the forward extending ears 1e comprising a portion of the base of the casing 1. By means of the screws 37 threadedly mounted upon the ears 1e, the shaft 36 is held firmly with relation to the respective stems 15 for the hot and cold water. It will be noted that the pedal shaft 36 is fulcrummed close to the floor level, avoiding the usual long and more easily destructible levers. The levers 30, too, are relatively short and are in direct contact with the stems 15, thereby providing a compact assembly having relatively great sturdiness.

As indicated by the drawings, the mechanical arrangement for the hot water valve is very similar to that described for the cold water valve except that in the hot water valve construction it will be seen that the elongated throttling screw 17 has been replaced by a frusto-conical throttling member 17a. The latter construction serves to throttle or restrain the free flow of hot water upon the initial movement or cracking (as it is also termed) of the valve from its seat. Such construction avoids the otherwise initial scalding effect of hot water upon possible opening of the hot water valve, and assures proper tempering at the outset by the cold water supply, since the latter valve, as indicated, is preferably provided with substantial flow and without a throttling means, upon being opened.

In the modification shown in Fig. 4, the throttling member 17a is made somewhat elongated, preferably of slightly greater length than the throttling member 17 of the cold water valve. An enlarged portion or head 18a, which likewise fits snugly within the seat opening 19a is provided, so that upon further movement of the valve 12 from its seat 11, the head portion 18a will commence to enter the opening 19a. In so doing, the volume of flow therepast is materially reduced so that the hot water at this stage of operation, being admixed only slightly, if at all, by the cold water is effectively throttled. By such difference in length, a lag is allowed between the time in which the cold water valve has been throttled to its maximum and when the hot water valve subsequently becomes fully throttled. The respective means used for adjustment for both hot and cold water valve travel is the same so that each one, simply depending upon the rotation of the screw 33 in each case, will definitely control the amount of movement of the valves by the increase or decrease of the clearance within the bifurcated or slotted portion 29 and maintained between the contacting ends of the screws 33 and levers 30 which, as previously stated, are preferably integral with the pedal 31. The pedal, upon being depressed, will therefore simultaneously control the respective movements of both the hot and cold water valves, depending upon the said clearance which exists as determined by the position of each adjusting screw 33.

This action of the respective hot and cold water valves is more clearly explained by referring to the graph of Fig. 7. There it will be noted that the cold water valve, as indicated by the solid line, opens to full flow relatively quickly, while the hot water, as indicated by the dotted lines, starts to increase its flow relatively gradually, then perceptibly increases its flow at the point in the operation of the pedal wherein the cold water flow has attained its maximum and has commenced to be throttled, due to the flow retarding effect of the head 18. The increase in flow of the hot water continues, while the cold water flow rapidly decreases, thereby accelerating the effectiveness of the hot water temperature. When the hot water flow reaches its maximum discharge, the cold water flow is almost completely stopped, except for the slippage therepast the head 18. Thus far the operation of the respective valves is based upon the disclosure shown in Figs. 1 and 2, which construction may be satisfactory for most installations. However, continuing the operation from this point and using the modified throttling construction described in connection with Fig. 4, as the actuating pedal 31 is further depressed, the hot water valve obviously is lifted still higher from the valve seat 11. But, at this stage, instead of the flow continuing to increase as is true of the hot water valve construction shown in Figs. 1 and 2, the head 18a of Fig. 4 is, by such further pedal and stem movement, drawn into the seat opening 19a, and thereby substantially throttling or reducing the flow, continuing to have such restrictive effect until almost complete stoppage of flow of hot water takes place, except, as explained in connection with the description of the operation of the cold water valve, for such slippage as may occur past the periphery of the head 18a.

This last detailed description provided by the modification of Fig. 4 is clearly indicated by the chart of Fig. 7 in which the rapid decrease or throttling in flow of hot water is graphically shown, as determined by actual test results, finally reaching substantially the same reduced flow earlier obtained by the cold water valve.

It should thus become apparent that exceedingly fine control of temperature is obtained, which is also verified by test results upon which the chart of Fig. 5 is based. Further, the throttling members 17 and 17a may be transposed or modified considerably to suit the various demands made upon a device of the type in the many classes of service to which it is adaptable.

As a matter of practical convenience in installation and for the purpose of protecting the casing 1 and its operating parts while in service, although obviously not indispensable, a housing 38 preferably having a forwardly sloping portion is provided, so as to be quickly attachable to the upper portion of the casing 1 by means of the screw 39, as shown more clearly in Fig. 2. The casing 1 is securely attached to the floor by means of the screws 40 extending through its base.

It will be noted that the mixed water upon flowing into the respective seat inlets 19 and 19a of the cold and hot water valves then passes into the common or mixing chamber 1b of the casing 1. As more clearly shown in Fig. 2, the mixed flow then continues into the upper chamber 1c and into the outlet 1d which, as stated, may be connected in the usual manner to other service piping or directly connected to a plumbing supply fixture for use upon a conventional lavatory, hydrotherapeutic treatment devices, baths, or any of the numerous plumbing fixtures with which hot and cold water and the mixture thereof is a necessary requirement to comfort, health and sanitation.

The foregoing detailed description of the construction and operation of our device, together with the test results of its performance, clearly demonstrates that our invention is capable of being exemplified in many varieties of forms, and it is desired therefore that our patent protection be measured only by the scope of the claims appended hereto;

We claim:

1. In a mixing valve comprising a casing having a plurality of fluid inlets thereto and a fluid outlet or outlets therefrom, simultaneously operable valves for the control of fluids through the said inlets, independently adjustable actuating means for the said valves, means exterior of the said casing for the adjustment of the said actuating means including a pedal operated shaft engaging a plurality of bifurcated portions of the said valve actuating means, independent flow throttling means for the said valves, one of the said throttling means having a reduced middle and end portion adjacent to the seat when the valve is in its closed position, the other end thereof being substantially larger, the said throttling means providing that upon initial movement of the actuating means and the valves in the opening direction the flow through either or both of said valves is substantially diminished, and upon continued movement thereof in the opening direction substantially maximum flow past the said valves occurs, after which at a position approaching the limit of the said actuating means in the opening direction the flow past either or both of said valves is substantially diminished.

2. In a mixing valve comprising a casing having a plurality of fluid inlets thereto and a fluid outlet or outlets therefrom, simultaneously operable valves for the control of fluids through the said inlets, a single independently adjustable pedal operated shaft for the said valves, the said shaft cooperating with separate split shafts engageable by the said valves, threaded means exterior of the said casing for adjustment of the angular positioning of the said pedal operated shaft whereby predetermined longitudinal movement of the said split shafts for each valve is provided, independent cylindrically formed throttling means within the inlets of each of the said valves, one of the said throttling means having respective reduced intermediate and end portions, the latter end portion being adjacent to the seat when the valve is in its closed position, the other end portion thereof being substantially larger and of substantially inverted frusto-conical form, said throttling means in cooperation with said pedal operated shaft providing that upon initial longitudinal movement of the said split shafts the flow through each of said inlets is substantially reduced but upon continued rotation of the pedal shaft substantially increased flow through the said inlets occurs, and upon further rotating the said pedal operated shaft to an extent approaching the limit of such movement the flow through one of the said inlets is substantially reduced.

3. In a mixing valve comprising a casing having a plurality of fluid inlets thereto and a fluid outlet or outlets therefrom, simultaneously operable valves for the control of fluids through the said inlets, independently adjustable actuating means for the said valves, means exterior of the said casing for the adjustment of the said actuating means including a pivotally movable means engaging a plurality of perforated portions of the said valve actuating means, independent flow throttling means for the said valves, one of the said throttling means having a reduced intermediate portion adjacent to the seat when the valve is in its closed position, the ends of said latter throttling means being substantially larger, the said throttling means providing that upon initial movement of the actuating means and the valves in the opening direction the flow through both of said valves is substantially diminished, and upon continued movement thereof in the opening direction substantially maximum flow past the said valves occurs, after which at a position approaching the limit of the said actuating means in the opening direction the flow past either or both of said valves is substantially diminished.

ROY H. ZINKIL.
EDWARD A. FREDRICKSON.